United States Patent
Kenbeek (12) 
(10) Patent No.: US 6,320,670 B1
(45) Date of Patent: Nov. 20, 2001

(54) METHOD AND SYSTEM FOR ADDRESS DETERMINATION

(75) Inventor: Dennis L. Kenbeek, Glastonbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/002,060

(22) Filed: Dec. 31, 1997

(51) Int. Cl.[7] .............................. B41B 15/00; B41J 15/00; H04K 1/00; G09C 3/08
(52) U.S. Cl. ...................... 358/1.16; 358/1.14; 358/1.15; 358/1.18; 380/25; 380/51
(58) Field of Search ..................................... 395/117, 115, 395/114, 112, 113, 101; 358/1.16, 1.18, 1.15, 1.13, 1.14, 1.1, 1.17; 380/25, 51, 23

(56) References Cited

U.S. PATENT DOCUMENTS

| | | | |
|---|---|---|---|
| 4,858,907 | | 8/1989 | Eisner et al. ......................... 271/124 |
| 5,175,691 | * | 12/1992 | Baker et al. .......................... 364/478 |
| 5,278,947 | * | 1/1994 | Balga et al. .......................... 395/117 |
| 5,326,181 | | 7/1994 | Eisner et al. ......................... 400/104 |
| 5,387,783 | * | 2/1995 | Mihm et al. .......................... 235/375 |
| 5,583,970 | * | 12/1996 | Strobel ................................. 395/114 |

FOREIGN PATENT DOCUMENTS

| | | |
|---|---|---|
| 0 341 040 | 5/1989 | (EP) . |
| 0 663 652 A2 | 12/1994 | (EP) . |

OTHER PUBLICATIONS

Publication No. 01233882—Character Processor—(Inventor: Sakaguchi Noriyuki)—Patent Abstracts of Japan–Abstract.

* cited by examiner

*Primary Examiner*—Edward Coles
*Assistant Examiner*—Twyler Lamb
(74) *Attorney, Agent, or Firm*—Michael J. Cummings; Michael E. Melton

(57) ABSTRACT

The invention is a method and system for determining an address from a print buffer stream. The method begins with initializing an address detection and determination routine, and then directing a print buffer stream to be read by the address detection and determination routine. In reading the print stream data, the application tokenizes address data resident in the print stream before comparing the tokenized data with data tables wherein each of the data tables comprises address characteristics. In making the comparison of the tokenized address data, the method then determines whether or not the tokenized address data matches a format in one of the data tables. If a match is found, then the method applies a coding scheme to the matched data. The coding scheme being determined in accordance with the matched data's corresponding data table. Matched data is coded in accordance with the coding scheme to create a coded address. If a match can not be determined, then the tokenized data is placed in a memory of the addressing system for subsequent analysis or use. Each of the data tables within the system further comprise data establishing a definition of a particular address description based on carrier requirements. Address description is further defined by country specific address requirements; which in turn further comprise: linking files for use by an addressing software application to link an applicable data table with the application for the purpose of parsing address data based upon requirements resident in the data tables; barcoding requirements; and, postal zone requirements, if any, for postal coding.

16 Claims, 5 Drawing Sheets

METHOD AND SYSTEM FOR ADDRESS DETERMINATION

BACKGROUND OF THE INVENTION

Addressing systems are an example of systems whose purpose is to utilize address lists, perform addressing hygiene through the use of address correction techniques, assign barcoding and, download data to addressing printers, collators, sealers, and the like for the purpose of producing a mailpiece.

The print stream introduced to addressing systems is generally in the form of an address list, though it may take on other forms. The list must be parsed and checked before format correction and barcoding techniques can be directed to the addresses on the list before creation of a mailpiece.

Mailpiece production systems are known in the art and have developed with changes in postal service regulations (such as those of the United States Postal Service, or USPS) and with the proliferation of appropriate software applications. In turn, this production has served the need to automate and accelerate to accommodate growth.

As the USPS, together with the postal services of other countries around the world, moves toward more fully automated mail handling in an effort to contain costs while processing ever increasing volumes of mail, automated equipment which sorts and processes mail on the basis of machine readable postal codes, such as the "zip code" or other forms of postal coding, play an ever more significant role. In the United States, postal service regulations provide for a "Postnet" bar code which represents the five, nine, or eleven digit zip code of the destination address in a machine readable form. 4-State can be utilized within Canada.

Systems have been used or proposed to meet the need to produce mail pieces imprinted with the Postnet bar code, and to enable mailers to obtain the benefit of the discounts offered for such mail. One such system is described in U.S. Pat. No. 4,858,907, for a SYSTEM FOR FEEDING ENVELOPES FOR SIMULTANEOUS PRINTING OF ADDRESSES AND BAR CODES, issued to Eisner et al. (hereinafter referred to as Eisner-1) on Aug. 22, 1989. This patent discloses a system for printing envelopes with addresses, zip codes, and corresponding bar codes. The system is controlled by a computer which includes software for converting a zip code included in the address into bar code form and then adding the bar code representation to the material to be printed on the envelope.

Another example of the art is found in U.S. Pat. No. 5,326,181 for an ENVELOPE ADDRESSING SYSTEM ADAPTED TO SIMULTANEOUSLY PRINT ADDRESSES AND BAR CODES; issued on Jul. 5, 1994 to Eisner et al. (hereinafter referred to as Eisner-2). This patent teaches a method of addressing substrates with a human readable address containing a zip code and a bar code corresponding to the zip code. The method utilizes a computer and comprises several steps. These steps include: receiving in the computer a plurality of addresses, with pre-existing zip code information contained in each as complete address data, and requiring no manual inputting or identification; automatically scanning the address data in the computer to find the pre-existing zip code; automatically converting, in the computer, the pre-existing zip code into a line of corresponding bar code; and, essentially simultaneously printing the complete address, including zip code information and corresponding bar code, on a substrate, under control of the computer so that the substrate produced has human readable zip code and machine readable bar code information thereon.

Additionally, a system for printing envelopes with addresses including bar code is disclosed in commonly assigned U.S. Pat. No. 5,175,691 for a SYSTEM AND METHOD FOR CONTROLLING AN APPARATUS TO PRODUCE ITEMS IN SELECTED CONFIGURATIONS; issued on Dec. 29, 1992 to Baker et al. (hereinafter referred to as Baker), which describes a system for printing mail pieces which includes a printer for printing sheets and envelope forms and a folder-sealer mechanism for folding the envelope form around the sheets to form a mail piece, and a computer based control system for controlling the printer and folder. In the system of this application, when an operator is creating a file of letters to be printed, the operator may designate a selected field within each letter as containing the destination address. The system will then extract the information in this designated field and with it create a new page of material to be printed on the envelope form; and, if the address within the designated field includes a zip code, the system will add a corresponding barcode to the new page. The system then adds this new page to the file before the file is output.

U.S. Pat. No. 5,278,947 for a SYSTEM FOR AUTOMATIC PRINTING OF MAIL PIECES; issued Jan. 11, 1994 to Balga, Jr. et al. (hereinafter referred to as Balga), and assigned to the assignee of the present claimed invention, is for a system which includes a printer for printing text in response to the input of signals. The printer has a capability to selectively print either sheets or envelopes. The system further includes a controller for output of a sequence of signals representative of materials to be printed on a sheet which forms part of the mail piece, where the sequence includes a subset of signals representative of an address.

In accordance with another aspect of the Balga invention, the system includes a scanning mechanism for identifying a character string which conforms to a valid postal coding standard. The system further includes a mechanism for identifying the character string as a valid postal code. Additionally, the system forms the destination address to include a line including the postal code and a selected number of proceeding lines of text.

The ability to structure software coding is extremely important when linking data to be downloaded to a printer being utilized in the addressing environment. U.S. Pat. No. 5,583,970 for a PRINTER COMMAND SET FOR CONTROLLING ADDRESS AND POSTAL CODE PRINTING FUNCTIONS, issued Dec. 10, 1996 to Strobel (hereinafter referred to as Strobel), and assigned to the assignee of the present claimed invention, is instructive in this respect.

Strobel is a method and system for printing images to a substrate wherein the commands normally input by an operator, or resident within the printer, can be determined at a host data processor. The system can control address and postal code printing functions beginning at the host computer together. The system will derive printing data, including address data, from a selected application resident in the host computer. The host computer creates and then transmits printer command sets and printing data, via transmitting means to a microprocessor within the printer. The microprocessor drives a language interpreter which directs the printer commands to a parsing step for determining the address location from within the data to be printed. The language interpreter then assigns delivery point digits to a zip code that was isolated from the transmitted address data. The newly created zip code is then matched with the bar code data stored within the microprocessor's corresponding memory. A bar code corresponding to the new zip code is selected. The language interpreter then directs the printer's controller to prepare to print the address with its corresponding zip code, any graphics images that may have been included within the print data, and text, if any. The printer controller positions the bar code for printing, and then prints the bar code and address data, zip code, and any graphics images and text to an envelope or other substrate.

Thus, Strobel overcame the limitations of the prior art by providing flexibility in determining what data, and how much, may be downloaded for printing to a substrate. Flexibility is accomplished by controlling address and postal coding functions in the printer from a host computer. The invention thus simplifies the firmware required in a selected printer, or can allow the performance of additional tasks or provide for greater database functionality under the direction of the printer microprocessor. Thus, printer ROM memory can be reduced or freed up for other tasks, and RAM memory can be increased to handle more detailed data.

A particular limitation to current systems, however, is found with mixed destination address lists where some addresses are outside the scope of the local postal service requirements. Address hygiene and coding application software may not be appropriate for coding mailpieces where address structure and its associated barcoding schemes do not conform to local postal service requirements. Therefore, it is an object of the present invention to provide for a method and system, for determining an address, together with its associated structure and barcoding in an environment where an address list may contain mixed or foreign addressing requirements.

SUMMARY OF THE INVENTION

The limitations of the prior art are overcome by a method and system for determining an address from a print buffer stream.

The method begins with initializing an address detection and determination routine, and then directing a print buffer stream to be read by the address detection and determination routine. In reading the print stream data, the application tokenizes address data resident in the print stream before comparing the tokenized data with data tables wherein each of the data tables comprises address characteristics.

In making the comparison of the tokenized address data, the method then determines whether or not the tokenized address data matches a format in one of the data tables. If a match is found, then the method applies a coding scheme to the matched data. The coding scheme being determined in accordance with the matched data's corresponding data table. Matched data is coded in accordance with the coding scheme to create a coded address. If a match can not be determined, then the tokenized data is placed in a memory of the addressing system for subsequent analysis or use.

Each of the data tables within the system further comprise data establishing a definition of a particular address description based on carrier requirements. Address description is further defined by country specific address requirements; which in turn further comprise: linking files for use by an addressing software application to link an applicable data table with the application for the purpose of parsing address data based upon requirements resident in the data tables; barcoding requirements; and, postal zone requirements, if any, for postal coding.

The data tables can be specific to one set of requirements or may incorporate several; these further correspond to: a particular carrier's addressing requirements and rules for applying those requirements; a particular country's postal zone coding requirements and rules for applying those requirements; barcoding data and rules for applying said barcoding to addresses matched with addressing requirements of said each of said data tables; or, a combination of all three requirement types.

The aforementioned requirements are handled by the addressing software application in accordance with address correction routines for correcting a parsed matched address.

The addressing system of the present invention further comprises: a microprocessor; application software in relationship with the microprocessor, and wherein the application software further comprises address detection and determination means for reading the print buffer stream and tokenizing means for flagging address data contained within the print buffer stream so as to create tokenized data. The system also includes data tables comprising address characteristics, and comparison means for comparing tokenized data with each of the data tables. Additionally, means are included for: determining whether or not tokenized data matches a data format in any one of the data tables; applying to a coding scheme to the tokenized data if the tokenized data matches a data format; and, coding means for coding the matched tokenized data. The addressing system further comprises a printer for printing the matched tokenized data to a substrate such as an envelope.

DETAILED DESCRIPTION OF THE PREFERRED EMBODIMENTS

Figure 1:
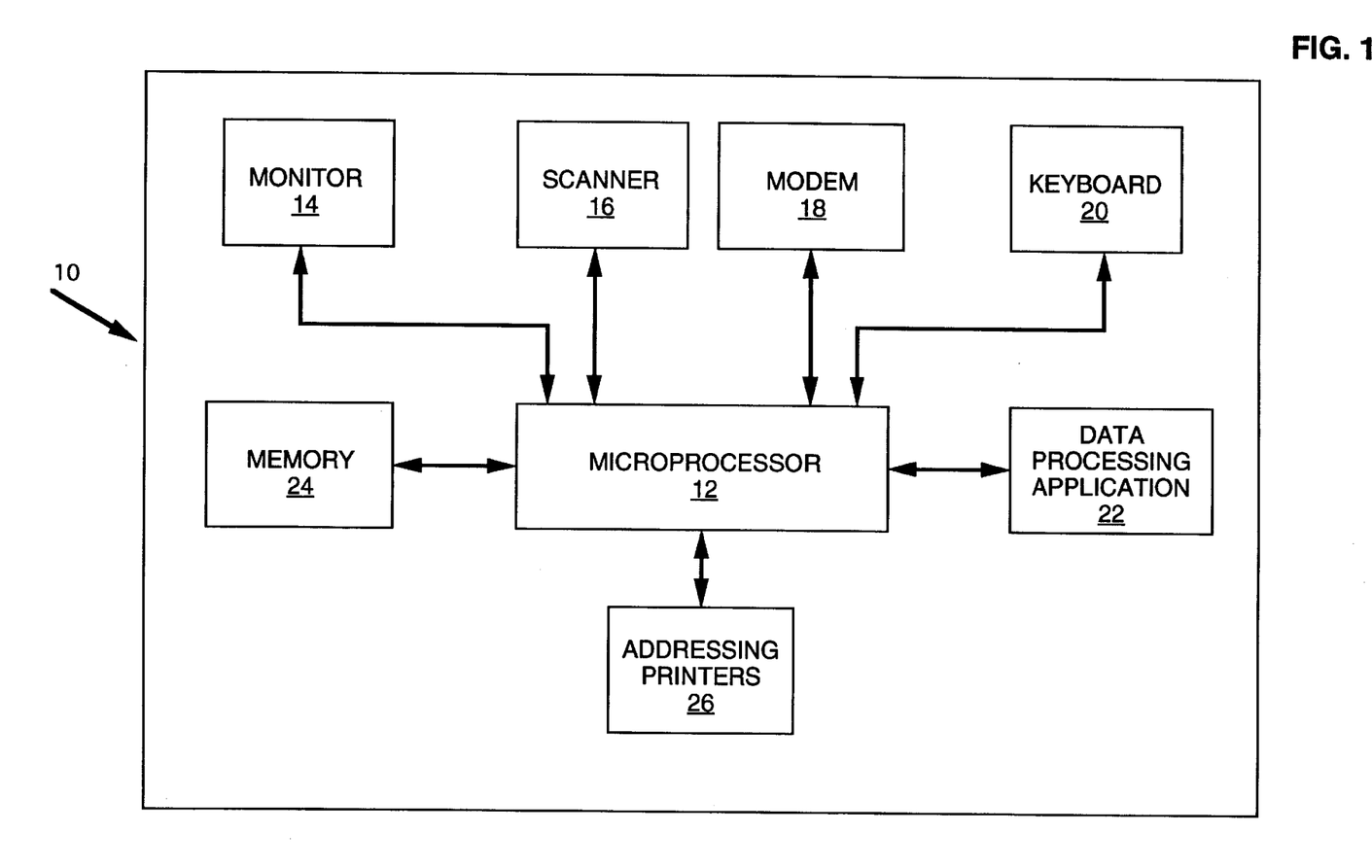
FIG. 1 is a block diagram of a typical addressing system 10 within which the method of the present invention could reside and be utilized.

The prior art method of invoking postal coding and address manipulation functionality for use with a document is shown in FIG. 1.

Turning to FIG. 1, there is shown a block diagram of a typical addressing system 10 within which the method of the present invention could reside and be utilized.

System 10 comprises a microprocessor 12 interoperatively connected to monitor 14 for viewing the address data being collected to form the mail list. The viewing of the address data on monitor 14 promotes ease of use in word and data processing, and provides an example of the human interface that can be brought to system 10. The monitor 14, under control of the data processing application 22, is able to show the system user: the status of each printer; current container number; current package number; current envelope number; and number of envelopes in a container. Microprocessor 12 is interoperatively connected to scanner 16. Scanner 16 provides system 10 with the ability to scan address field data, barcodes, or other scannable data sources as an input to data processing application 22. Addressing printer 26 is also interoperatively connected to microprocessor 12 and serves as the output devices by which address data is printed to a substrate such as envelopes. Additionally, keyboard 20 is interoperatively connected to microprocessor 12 and serves as an input device for the creation of documents or the input of data. Modem 18 gives system 10 the ability to communicate with other systems via communications means of varied types; and, memory 24 allows the system to retain data for use in building mailing lists or storing data for future use.

Figure 2:
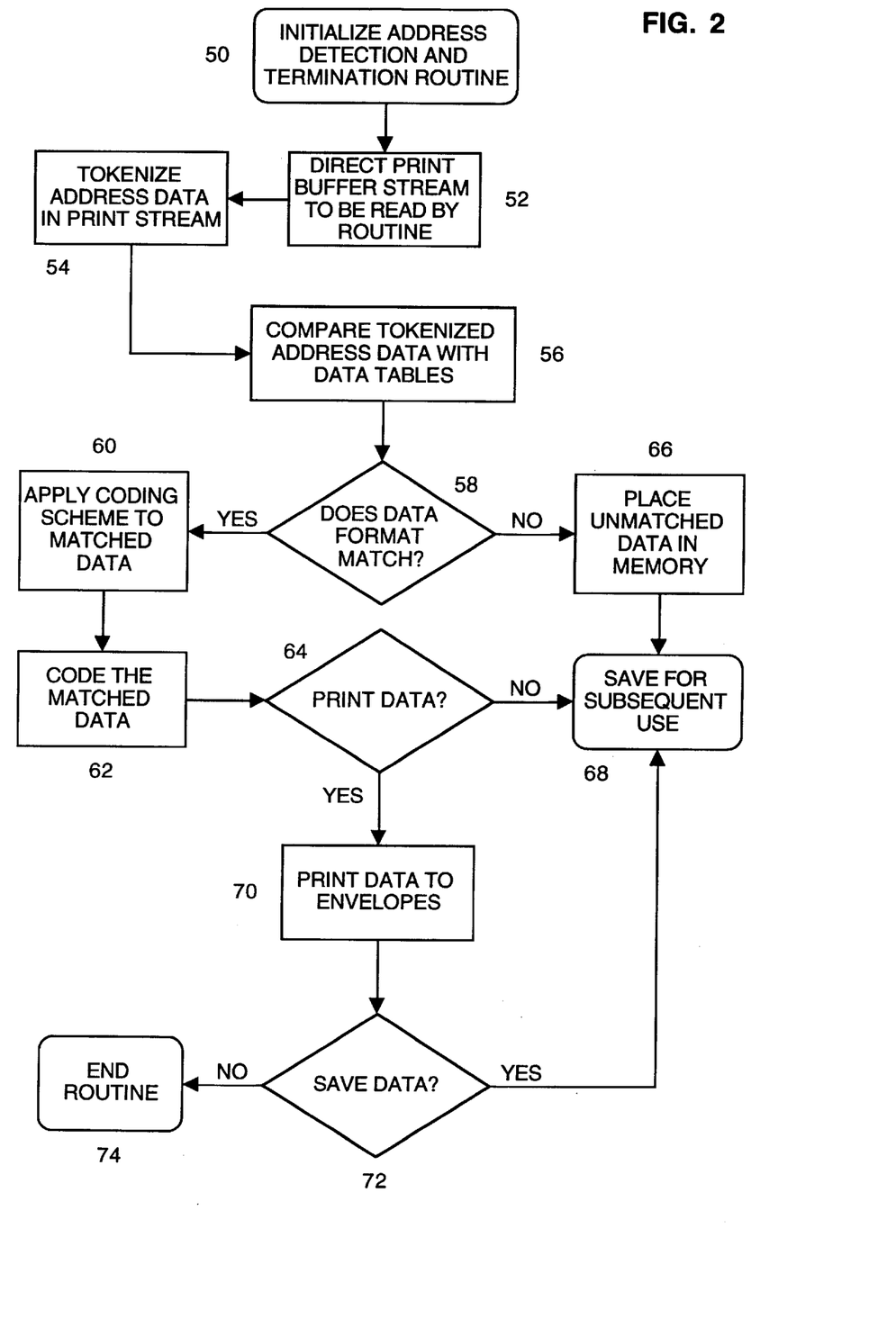
FIG. 2 is an upper level flowchart of the method of the present invention wherein an address is determined from a print buffer stream and prepared for coding.

Turning to FIG. 2, there is shown an upper level flowchart of the method of the present invention wherein an address is determined from a print buffer stream and prepared for coding.

The method begins at step 50 with initialization of an address detection and determination routine, and then directs the print buffer stream to be read by the address detection and determination routine at step 52. In reading the print stream data, the application tokenizes address data resident in the print stream at step 54 before comparing the tokenized data, at step 56, with data tables wherein each of the data tables comprises address structure characteristics.

In making the comparison of the tokenized address data, the method then determines, with a query at step 58, as to whether or not the tokenized address data matches a format in one of the data tables. If the response to the query is "YES," and a match is found, then the method applies a coding scheme to the matched data at step 60. The coding scheme being determined in accordance with the matched data's corresponding data table. The matched data is coded, at step 62, in accordance with the coding scheme to create a coded address. If, however, the response to the query at step 58 is "NO," and a match can not be determined, then, at step 66, the tokenized data is placed in a memory of the addressing system for subsequent analysis or use in step 68.

Returning to step 62, the method advances to a query at step 64 which asks if the matched address data is to be printed. If the response to the query is "NO," then the method advances to step 68 where the data is placed in a memory of the addressing system for subsequent analysis or use. However, if the response to the query at step 64 is "YES," then the method utilizes, at step 70, a printer to print the addresses to a substrate such as an envelope. From step 70, the method advances to a query at step 72.

At step 72, the system queries as to whether or not the data just printed is to be saved within the system memory. If the response to the query is "YES," then the method returns to step 68 where the data is placed in a memory of the addressing system for subsequent analysis or use. If the response to the query at step 72 is "NO," however, then the method advances to step 74 and the routine is ended.

Figure 3A:
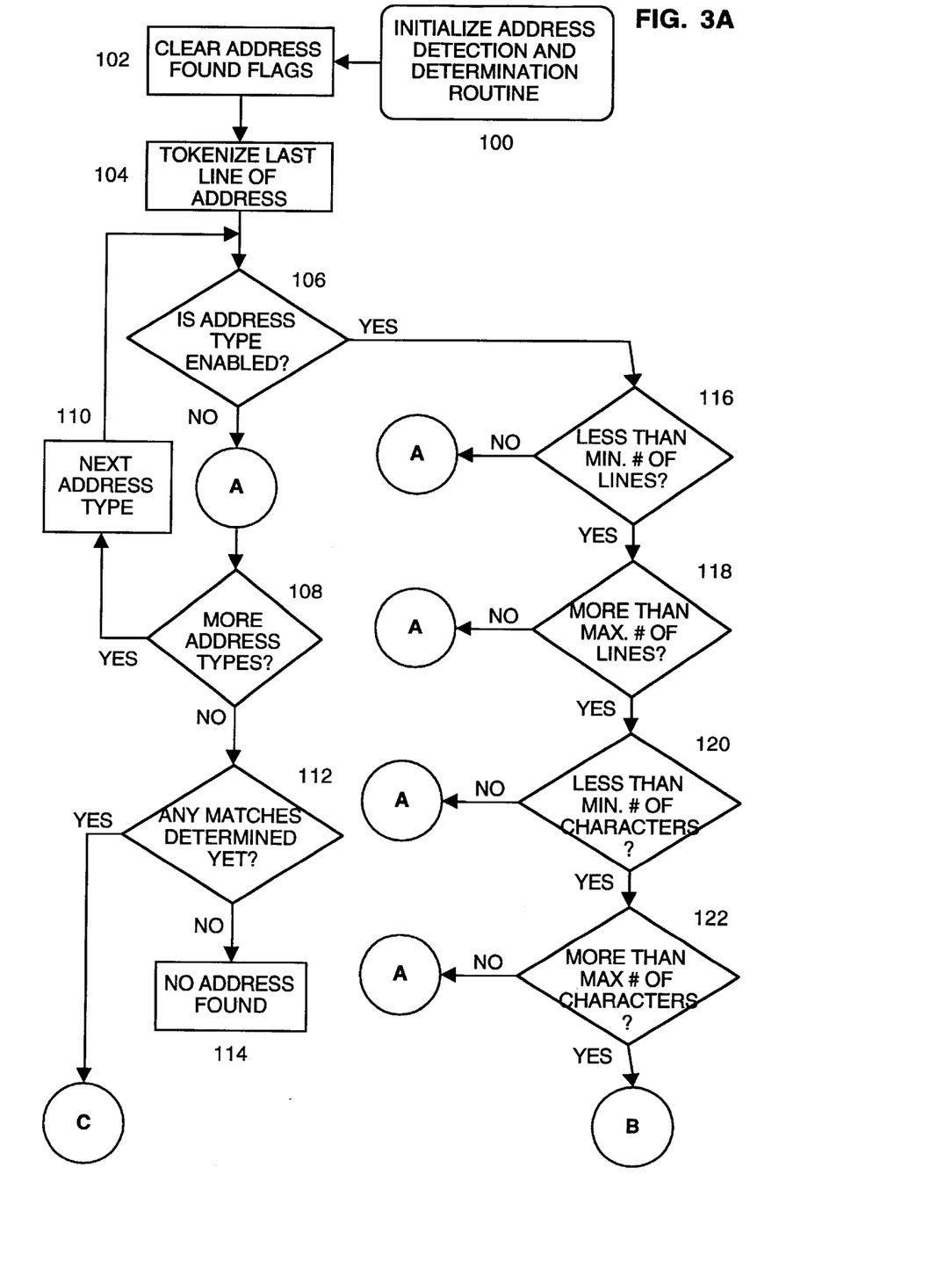
FIG. 3A is a detailed flowchart of the method of the present invention.

Beginning with FIG. 3A, the method and system of the present invention are discussed in greater detail with respect to address determination. An address is defined as that data defining a sender or a receiver of a mailpiece. An address comprises specific data which allows the mailpiece to be delivered to the receiver. Addresses for mailpieces generally fall within two classes: postal addresses and non-postal addresses.

Addresses have a number of characteristics which are instructive. Address data generally is layered in terms ascending significance; the most significant is generally the postal code (zipcode in the U.S.). Additionally, address data when part of a larger data set usually is set off from the next data entry. Using these assumptions, an address can be more specifically defined using a set of parameters. These parameters include: a minimum number of lines; a maximum number of lines; a minimum number of characters per line; a maximum number of characters per line; a signature of the most significant data (i.e., zipcode); the most significant data must be on the last one or two lines; type designation (i.e., country name); and some key word.

The understanding of the address itself is important in understanding the process of determination of the type of address that a particular print stream may contain. Address detection and determination is generally performed on a file of data and can occur as a dynamic or as a static activity. As a dynamic activity, address detection and determination generally occurs between the application and the data stream actually being sent to a printer for printing. As a static process, however, the activity stands on its own and is performed on the data in a disk file as opposed to a simple memory file.

Turning to FIG. 3A, there is shown a detailed flowchart of the method of the present invention.

The method flow begins at step 100 where an address detection and determination routine is initialized. During initialization, address definitions are generally loaded from permanent storage (i.e., a disk) to temporary storage (i.e., a memory file) for faster access. From step 100, the method advances to step 102 where an address is located which flags the routine. Once an address is found, it is tested against various parameters to determine the address type. Testing is performed by comparing the address characteristics to predetermined characteristics listed in data tables.

Each of the data tables within the system further comprise data establishing a definition of a particular address description based on carrier requirements. Address description is further defined by country specific address requirements; which in turn further comprise: linking files for use by an addressing software application to link an applicable data table with the application for the purpose of parsing address data based upon requirements resident in the data tables; barcoding requirements; and, postal zone requirements, if any, for postal coding.

The data tables can be specific to one set of requirements or may incorporate several; these further correspond to: a particular carrier's addressing requirements and rules for applying those requirements; a particular country's postal zone coding requirements and rules for applying those requirements; barcoding data and rules for applying said barcoding to addresses matched with addressing requirements of said each of said data tables; or, a combination of all three requirement types. The aforementioned requirements are handled by the addressing software application in accordance with address correction routines for correcting a parsed matched address.

Additionally, once the document has been parsed and prior to barcoding, the system user can then elect to have address manipulation functionality applied to the document text. Typically, this functionality would include the ability to parse address field data and to reformat the address field data as required. The system user, or the system itself through a default parameter, can also elect to have postal coding functionality applied to the address. Typically, this functionality would include the ability to parse address field data to determine a postal code; the postal code could then be used as determinative of an appropriate barcode.

Returning to step 102, the method advances from step 102 to step 104 where the application tokenizes the last line of the address so that it can be applied against the data tables. The method then advances from step 104 to a query at step 106 which asks whether or not a particular address type has been enabled for the present system. If the response to the query is "NO," then the method advances through point "A" to a query at step 108. At step 108, the query determines whether or not there are more address types to consider for comparison. If the response to the query is "NO," then the method advances to a query at step 112. However, if the response to the query at step 108 is "YES," then the method advances to step 110 for the next address type before returning to enter the method flow at step 106.

Returning to step 106, if the response to the query is "YES," then the method advances to a series of queries beginning at step 116. If the address type has been enabled by the system, then step 116 queries as to whether or not the address is less than the minimum number of lines. If the response to the query is "NO," then the method returns to point "A" located in the path between steps 106 and 108. If, however, the response to the query at step 116 is "YES," then the method advances to a query at step 118.

If the address type has been enabled by the system, then step 118 queries as to whether or not the address is more than the maximum number of lines. If the response to the query is "NO," then the method returns to point "A" located in the path between steps 106 and 108. If, however, the response to the query at step 118 is "YES," then the method advances to a query at step 120.

If the address type has been enabled by the system, then step 120 queries as to whether or not the address is less than the minimum number of characters. If the response to the query is "NO," then the method returns to point "A". If, however, the response to the query at step 120 is "YES," then the method advances to a query at step 122. Step 122 queries as to whether or not the address is more than the maximum number of characters. If the response to the query is "NO," then the method returns to point "A". If, however, the response to the query at step 122 is "YES," then the method advances to path B which re-enters the method flow at step 124 as is shown in FIG. 3B.

Returning to step 112, the method queries as to whether or not the system has determined any matches. If the response to the query is "NO," then the method advances to step 114, indicates that no matches have been found, and quits the routine. If the response is "YES," however, then the method advances along path C to re-enter the method flow at step 144 as is shown in FIG. 3C.

Figure 3B:
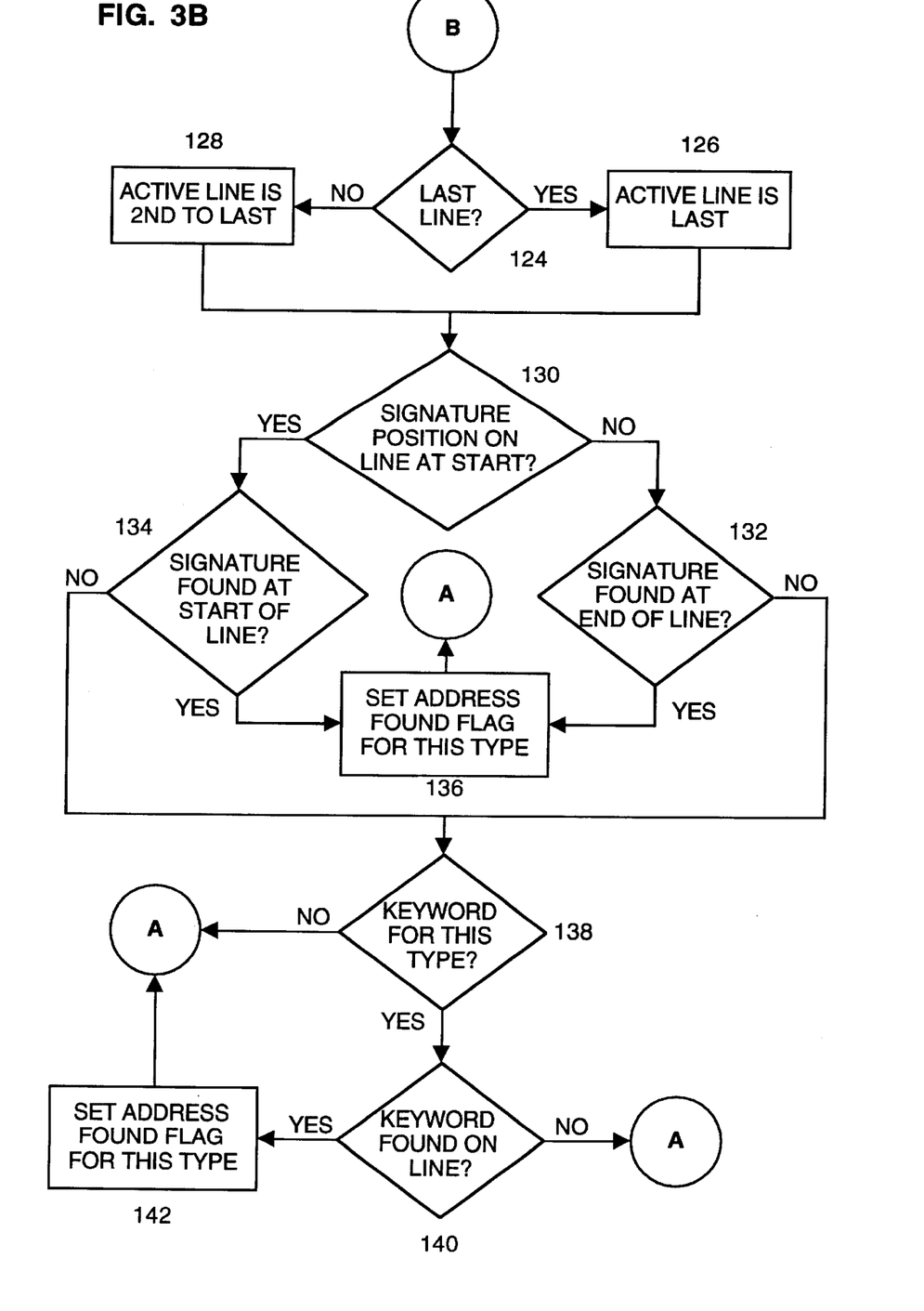
FIG. 3B is a continuation of the flowchart of FIG. 3A.
Figure 3C:
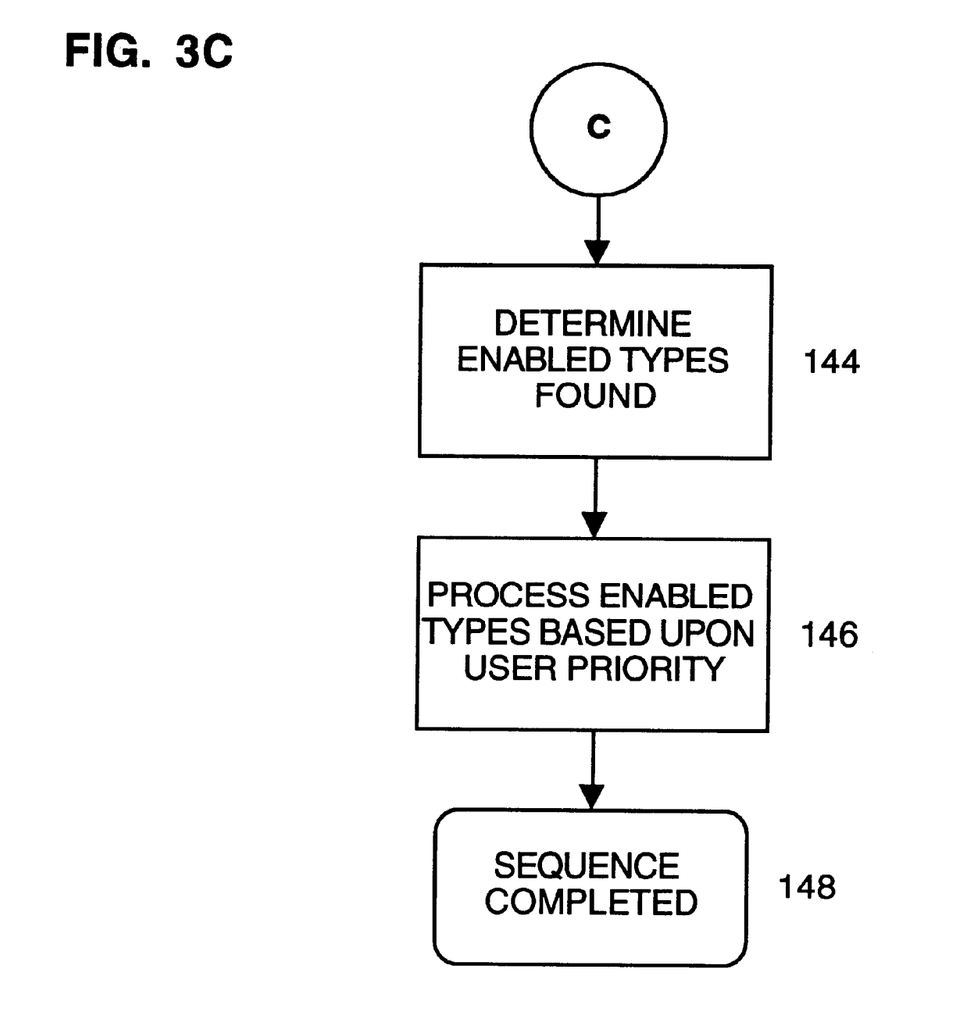
FIG. 3C is a continuation of the flowchart of FIG. 3B.

Turning to FIG. 3B, there is shown path B re-entering the system flow at step 124. At step 124, the method queries as to whether or not the addresses last line has been reached. If the response to the query is "NO," then the system determines, at step 128, that the address' active line is the second to last line. If the response to the query is "YES," then the system determines, at step 126, that the last line is the active line. Both steps 126 and 128 advance to the query at step 130.

Step 130 determines where the address signature element is located by querying as to whether or not the signature position is on the line. If the response to the query is "YES," then the system advances to the query at step 134 which asks if the signature were found at the start of the line. If the response to the query at step 134 is "NO," then the method advances to the query at step 138. If, however, the response to the query at step 134 is "YES," then the method advances to step 136 where the address is flagged as "found" before advancing to point A between steps 106 and 108.

Returning to step 130, if the response to the query is "NO," then the method advances to the query at step 132 which asks if the signature were found at the end of the line. If the response to the query at step 132 is "NO," then the method advances to the query at step 138. If, however, the response to the query at step 132 is "YES," then the method advances to step 136 where the address is flagged as "found" before advancing to point "A" between steps 106 and 108.

Looking toward step 138, the method queries as to whether or not there is a keyword for this address type. If the response to the query is "NO," then the method advances to point "A". If the response to the query is "YES," then the method advances to the query at step 140 which asks if the keyword was found on the line. If the response to the query is "NO," then the method advances to point "A". However, if the response to the query at step 140 is "YES," then the method advances to step 142 where the address is flagged as "found" before advancing to point "A".

Turning to FIG. 3C, there is shown path C re-entering the method flow at step 144. At step 144, the method determines which enabled address types have been found within the sampled print stream. Enabled addresses are processed for address correction or coding at step 146 before the method quits the sequence at step 148.

While certain embodiments have been described above in terms of the system within which the address object methods may reside, the invention is not limited to such a context. The system shown in FIG. 1 is one example of a host system for the invention, and the system elements are intended merely to exemplify the type of peripherals and software components that can be used with the invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In an addressing system having a print buffer stream introduced thereto, a method of deriving and utilizing an address from said print buffer stream, comprising the steps of:
   (a) directing said print buffer stream so as to be read by an address detection and determination routine;
   (b) identifying address information within said print buffer stream;
   (c) tokenizing data from said identified address information;
   (d) comparing said tokenized data with a plurality of data tables comprising address format requirements for a plurality of different carriers to determine whether said tokenized data matches a data format for a particular carrier;
   (e) coding address information in accordance with a coding format for the particular carrier determined in said comparing step, said coding format being stored in said plurality of data tables.

2. The method of claim 1, wherein said comparing step includes matching the number of lines present in the address information with the format requirements for the plurality of different carriers.

3. The method of claim 1, wherein said comparing step includes matching a keyword present in the address information with a keyword in the address format requirements for the plurality of different carriers.

4. The method of claim 1, wherein said plurality of data tables further comprise country specific address format requirements; the method further comprising
   (f) linking to an addressing software application to perform address hygiene based upon applicable requirements resident in said data tables.

5. The method of claim 1, wherein said plurality of data tables further comprise country specific address format requirements wherein the step of coding further includes determining a bar code.

6. The method of claim 1, wherein said plurality of data tables further comprise country specific address format requirements wherein the step of coding further includes determining a postal zone code.

7. The method of claim 1, wherein said plurality of data tables further comprise country specific address format requirements; the method further comprising (f) linking to an addressing software application to perform address hygiene based upon applicable requirements resident in said data tables; and
   wherein the step of coding comprises determining a barcode, and determining a postal zone code.

8. The method of claim 1 further comprising the step of storing tokenized data, for which no matching format was found during the comparing step, in a memory for subsequent analysis.

9. In an addressing system having a print buffer stream introduced thereto, a method of deriving and utilizing an address from said print buffer stream, comprising the steps of:

(a) directing said print buffer stream so as to be read by an address detection and determination routine;
   (b) identifying address information within said print buffer stream;
   (c) tokenizing data from said identified address information;
   (d) comparing said tokenized data with a plurality of data tables comprising address format requirements for a plurality of different countries to determine whether said tokenized data matches a data format for a particular country;
   (e) coding address information in accordance with a coding format for the particular country determined in said comparing step, said coding format being stored in said plurality of data tables.

10. The method of claim 9, wherein said comparing step includes matching the number of lines present in the address information with the format requirements for the plurality of different countries.

11. The method of claim 9, wherein said comparing step includes matching a keyword present in the address information with a keyword in the address format requirements for the plurality of different countries.

12. The method of claim 9 further comprising (f) linking to an addressing software application to perform address hygiene based upon applicable requirements resident in said data tables.

13. The method of claim 9 wherein the step of coding further includes determining a bar code.

14. The method of claim 9 wherein the step of coding further includes determining a postal zone code.

15. The method of claim 9 further comprising (f) linking to an addressing software application to perform address hygiene based upon applicable requirements resident in said data tables; and
   wherein the step of coding comprises determining a barcode and determining a postal zone code.

16. The method of claim 9 further comprising the step of storing tokenized data, for which no matching format was found during the comparing step, in a memory for subsequent analysis.

* * * * *